UNITED STATES PATENT OFFICE.

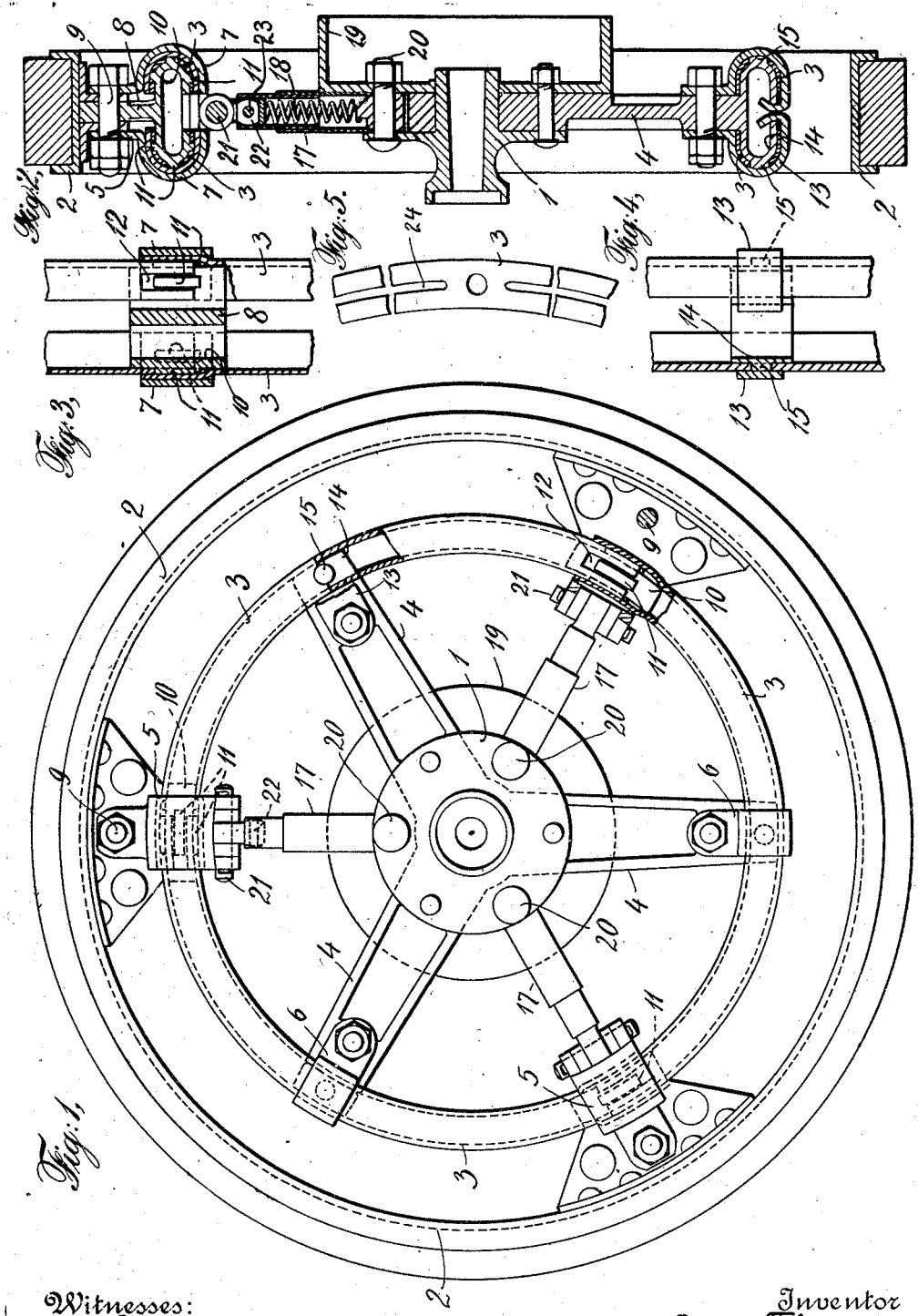

CARL C. THOMAS, OF MADISON, WISCONSIN.

SPRING-WHEEL.

1,025,433.   Specification of Letters Patent.   Patented May 7, 1912.

Application filed December 3, 1909.  Serial No. 531,128.

*To all whom it may concern:*

Be it known that I, CARL C. THOMAS, a citizen of the United States of America, and a resident of the city of Madison, county of Dane, and State of Wisconsin, have invented certain new and useful Improvements in Spring-Wheels, of which the following is a specification.

My invention relates to improvements in spring wheels, by which I mean, wheels of that type in which springs are interposed between the hub and the rim so that substantially the cushioning effect of a pneumatic tire is obtained without the well known disadvantages of pneumatic and other cushion tires.

My invention consists in the novel construction of the springs and the novel connections thereof to the hub and rim respectively, and in other features hereinafter described and particularly pointed out in the appended claims.

The object of my invention is to produce a strong and easy riding spring wheel, suitable for use not only as a carrying wheel but also as a driving wheel; to avoid the well known defects of pneumatic and other cushion tires involving the use of rubber, fabric, or other soft or yielding tire materials; to check undue movement of the hub with respect to the rim, and to make the wheel simple, reliable and relatively inexpensive.

I will now proceed to describe my invention with reference to the accompanying drawings and will then point out the novel features in claims.

In said drawings: Figure 1 shows a side elevation of a wheel embodying my invention, a portion of one of the springs and portions of the associated parts being shown in section. Fig. 2 is a transverse section of the wheel. Fig. 3 shows a fragmentary longitudinal section through one of the clamps connecting the springs to the rim, one of the springs being shown in section and the other in plan; Fig. 4 shows a fragmentary longitudinal section of one of the clamps connecting the springs to the spokes, one of the springs being shown in longitudinal section and the other in plan. Fig. 5 shows a fragmentary side view of an alternative form of spring.

In the said drawings, 1 designates the hub of the wheel, which hub, except as to the construction of its spokes, may be of any usual or suitable construction; 2 designates the wheel rim and 3—3 designates springs interposed between said hub and rim.

4—4 designate the spokes of the wheel. A plurality of springs (three in the instance shown) is customarily provided between the hub and rim, each such spring occupying a portion only of the complete circle. Each of these springs 3 is connected to the rim of the wheel by a clamp 5 secured to the inner side of the said rim, and each spring is secured to a corresponding spoke 4 of the wheel by means of a clamp 6. The adjacent ends of adjacent springs overlap somewhat, each spring being enlarged at one end to receive the end of the adjacent spring. The enlarged ends of the several springs are rigidly secured in the respective clamps 5, while the other spring ends, which fit within these enlarged ends, are free to move longitudinally therein, thus providing for end motion, which must accompany varying flexure of the spring, if excessive stresses in the springs are to be avoided.

As shown particularly in Fig. 2 the springs are double, or composed of longitudinal halves, each of U-section placed sidewise, so that the U's of the two halves face each other, the springs being therefore quite stiff in proportion to the weight and elasticity of the metal of which they are composed. A very important advantage of this section of spring is that it may be held frictionally in the clamps 5 and 6 without being riveted at these points.

It has been found that a spring held in place by rivets is exceedingly likely to break at the rivet, but the same is not true of a frictionally held spring. These springs are, in a broad sense, a variety of leaf spring, and in a broad sense, leaf springs would be equivalent to them if used in the wheel shown.

As shown particularly in Figs. 2 and 3, the clamps by which the enlarged ends of the springs are held to the rim, are formed by side plates 7 arranged in pairs, each pair embracing the enlarged end of a spring and secured to a center piece 8 by means of a bolt 9. This center piece has an enlarged head 10 fitting within the inner of the two telescoping spring-ends, and provided with projecting keys 11 fitting within slots 12 of the inner spring-end. This construction holds the outer spring end firmly while permitting the inner spring-end to move back and forth in telescopic fashion.

As shown particularly in Figs. 2 and 4 the clamps 6 by which the springs are secured to the spokes 4, comprise side plates 13 secured by bolts to their respective spokes, such spokes having enlarged ends 14 provided with projecting pins 15 fitting into holes in the springs. This construction provides for positive transmission of torque from the hub to the rim through the spokes, springs, and the clamps by which one end of such spring is secured to the rim, or, conversely, provides for the positive transmission of torque from the rim to the hub.

It is very desirable, in a spring wheel, to provide means for checking excessive flexure and vibration of the springs. To this end I have provided dash-pots 17 alternated with spokes 4 and connected to center pieces 8 of the spring clamps 5, and to the hub. Inside these dash pots I have provided cushion springs 18. I thereby obtain not only the cushioning effect of air compression or expansion, due to the working of the two parts of the dash-pot one within another, but also the cushioning effect due to the compression of the springs 18. These dash pots are connected to the spokes by pivot pins 20 so that they are free to assume easy positions in the plane of the spoke of the wheel, when the relative positions of the spokes and rim tend to change due to transmission of torque from the hub to the springs and thence to the rim, or vice versa. The plungers of the dash pots are also hinged to the center pieces 8, at 21, the axes of the hinges being in the plane of the wheel, the connection of the hinges to the plungers being by means of spherical heads 22 and hinge pins 23, the construction therefore forming a species of double hinge. By reason of these hinge connections the dash pots are able to assume easy positions in case of lateral motion of the rims with respect to the hub. Customarily, to secure the desired adhesion to the road bed, and also to provide for relatively silent movement of the wheel over the road bed, I provide the rim 2 with a solid tire which may be of rubber or any other suitable tire material.

In Fig. 2 I have shown the wheel provided with a brake flange 19. A driving gear, if such gear were to be applied to the wheel, would be applied in the same manner and in place of the brake part. One important advantage of this wheel is that, since the springs are easily removable and replaceable, if a spring should break it may be replaced easily. In practice it is much easier to do this than it is to replace a punctured or ruptured pneumatic or cushion tire.

When, as is sometimes the case, the springs prove to be too stiff, weaker or more flexible springs may be formed by cutting out portions of the spring at the base of the U. This I have indicated in Fig. 5, which shows a portion of one of the springs having openings 24 formed in it at the base of the U.

What I claim is:—

1. A spring wheel comprising a rim, a hub, and a plurality of cantaliver springs connecting said rim and hub and arranged approximately circularly, each said spring extending through a portion only of the complete circle, each said spring rigidly secured at an intermediate point to the hub, and secured rigidly near one end to the rim and slidably secured at the other end to the rim.

2. A spring wheel comprising two main members, namely, a rim and hub, and a plurality of cantaliver springs connecting said rim and hub and arranged approximately circularly, each said spring extending through a portion only of the complete circle, each such spring rigidly secured at an intermediate point to one of said main members, and secured at its ends to the other of such main members, one of its ends being so secured rigidly, the other end being free to move longitudinally.

3. A spring wheel comprising two main members, namely, a rim and a hub, and a plurality of cantaliver-springs connecting said rim and hub and arranged approximately circularly, each said spring extending through a portion only of the complete circle, each such spring rigidly secured at an intermediate point to one of said main members, and means securing the ends of each such spring to the other of said main members, comprising frictional clamps which hold one end of each spring rigidly while permitting longitudinal motion of the other end of the spring.

4. A spring wheel comprising two main members, namely, a rim and hub, and a plurality of cantaliver springs connecting said rim and hub and arranged approximately circularly, each said spring extending through a portion only of the complete circle, the adjacent ends of the springs arranged to telescope one within another, each such spring rigidly secured at an intermediate point to one of said main members, and secured at its end to the other of such main members, one of its ends being so secured rigidly, the other end being free to move longitudinally.

5. A spring wheel comprising two main members, namely, a rim and hub, and a plurality of cantaliver springs connecting said rim and hub and arranged approximately circularly, each said spring extending through a portion only of the complete circle, each such spring rigidly secured at an intermediate point to one of said main members, and secured at its end to the other of such main members, one of its ends being so secured rigidly, the other end being free to move longitudinally, and dash pots interposed between the rim and hub and serving to cushion movement of one with respect to the other.

6. A spring wheel comprising two main members, namely, a rim and hub, and a plurality of cantaliver springs connecting said rim and hub and arranged approximately circularly, each said spring extending through a portion only of the complete circle, each such spring rigidly secured at an intermediate point to one of said main members, and secured at its end to the other of such main members, one of its ends being so secured rigidly, the other end being free to move longitudinally, and cushion springs interposed between the rim and hub and serving to cushion movement of one with respect to the other.

7. A spring wheel comprising two main members, namely, a rim and hub, and a plurality of cantaliver springs connecting said rim and hub and arranged approximately circularly, each said spring extending through a portion only of the complete circle, each such spring rigidly secured at an intermediate point to one of said main members, and secured at its end to the other of such main members, one of its ends being so secured rigidly, the other end being free to move longitudinally, and dash pots connecting the rim and hub, and cushion springs associated with said dash pots, the two coacting to cushion movement of the rim with respect to the hub.

8. A spring wheel comprising two main members, namely, a rim and hub, and a plurality of cantaliver springs connecting said rim and hub and arranged approximately circularly, each said spring extending through a portion only of the complete circle, each such spring rigidly secured at an intermediate point to one of said main members, and secured at its end to the other of such main members, one of its ends being so secured rigidly, the other end being free to move longitudinally, and dash pots connecting the rim and hub, and cushion springs within said dash pots, the two coacting to cushion movement of the rim with respect to the hub.

9. A spring wheel comprising in combination two main members, a rim and a hub, and cantaliver springs of U-section connecting the rim and hub, arranged approximately circularly, and together forming an approximately circular ring intermediate the hub and rim.

10. A spring wheel comprising in combination two main members, a rim and a hub, and cantaliver springs of U-section connecting the rim and hub arranged approximately circularly, and together forming an approximately circular ring intermediate the hub and rim, such springs arranged in pairs side by side.

11. A spring wheel comprising two main members, a rim and a hub, springs of U-section arranged approximately circumferentially and connecting said main members, means for securing said springs to one of said members, and clamping means for securing said springs to the other of said main members, comprising center pieces adapted to fit within said U-shaped springs, and clamping plates.

12. A spring wheel comprising two main members, a rim and a hub, springs of U-section arranged approximately circumferentially and connecting said main members, and clamping means for securing said springs to said members comprising center pieces adapted to fit within said U-shaped springs, and clamping plates pressing said springs against said center pieces.

13. A spring wheel comprising two main members, a rim and a hub, springs of U-section connecting said main members, the ends of the springs telescoping one within another, means for securing said springs to one of said members, and clamping means for securing said springs to the other of said members, comprising clamping plates enveloping the telescoping portions of said springs, and center pieces adapted to fit within the telescopic portion of the inner spring, and clamping plates, and provided with keys engaging with slots in said springs.

14. A spring wheel comprising two main members, a rim and a hub, springs of U-section connecting said main members, clamping means securing the ends of said springs to one of said members, and means for securing said springs each at an intermediate point to the other of said members, comprising clamping means including a center piece having pins projecting through openings in said springs.

In testimony whereof I have signed this specification in the presence of two subscribing witnesses.

CARL C. THOMAS.

Witnesses:
H. P. REED,
R. S. BAIRD.